(12) United States Patent
Converse et al.

(10) Patent No.: US 10,734,814 B2
(45) Date of Patent: Aug. 4, 2020

(54) MAINTENANCE OPTIMIZATION CONTROL SYSTEM FOR LOAD SHARING BETWEEN ENGINES

(71) Applicant: Caterpillar Inc., Peoria, IL (US)

(72) Inventors: Perry Dwain Converse, Lafayette, IN (US); Robin Ernest de Ruiter, Hamburg (DE); Theodore Ernest Wiersema, III, Peoria, IL (US); Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 15/676,290

(22) Filed: Aug. 14, 2017

(65) Prior Publication Data
US 2019/0052093 A1 Feb. 14, 2019

(51) Int. Cl.
| | |
|---|---|
| *H02J 3/46* | (2006.01) |
| *G05B 15/02* | (2006.01) |
| *F02B 63/04* | (2006.01) |
| *H02P 9/04* | (2006.01) |
| *F01B 21/02* | (2006.01) |
| *B63J 3/00* | (2006.01) |
| *B63B 79/00* | (2020.01) |

(52) U.S. Cl.
CPC ............... *H02J 3/46* (2013.01); *F01B 21/02* (2013.01); *G05B 15/02* (2013.01); *H02P 9/04* (2013.01); *B63B 79/00* (2020.01); *B63J 3/00* (2013.01); *F02B 63/04* (2013.01)

(58) Field of Classification Search
CPC ............... H02J 3/46; H02J 3/50; H02P 9/02
See application file for complete search history.

(56) References Cited

U.S. PATENT DOCUMENTS

| | | | |
|---|---|---|---|
| 5,072,701 A * | 12/1991 | Khan | F02N 11/0803 123/142.5 E |
| 8,766,479 B2 | 7/2014 | Douglas et al. | |
| 2008/0082247 A1* | 4/2008 | Hawkins | B60L 15/38 701/101 |
| 2008/0238202 A1 | 10/2008 | Kern et al. | |
| 2008/0243353 A1* | 10/2008 | Hollenbeck | B60W 50/038 701/102 |

(Continued)

FOREIGN PATENT DOCUMENTS

| | | |
|---|---|---|
| CN | 104638650 | 5/2015 |
| CN | 104820406 | 8/2015 |

(Continued)

*Primary Examiner* — Thomas C Lee
*Assistant Examiner* — Charles Cai
(74) *Attorney, Agent, or Firm* — Miller, Matthias & Hull LLP

(57) ABSTRACT

A maintenance optimization control system for load sharing between includes a first engine having an associated first criteria, a second engine having an associated second criteria, and a load having a steady component and a transient component. The control system includes a controller communicably coupled to the first engine, the second engine and the load. The controller selects an engine from the first engine and the second engine based at least on the first criteria and the second criteria. The controller distributes the load between the first engine and the second engine such that only the selected engine is operated under transient component of the load.

20 Claims, 3 Drawing Sheets

(56) References Cited

U.S. PATENT DOCUMENTS

| | | | |
|---|---|---|---|
| 2008/0246338 A1* | 10/2008 | Donnelly | B60L 11/123 307/54 |
| 2010/0144219 A1 | 6/2010 | Balogh et al. | |
| 2010/0274420 A1* | 10/2010 | Veit | B63H 3/10 701/21 |
| 2014/0309797 A1* | 10/2014 | Frampton | H02P 9/02 700/287 |
| 2015/0345350 A1* | 12/2015 | Moore | F01M 13/04 123/572 |
| 2016/0036450 A1 | 2/2016 | McCall et al. | |
| 2016/0046382 A1* | 2/2016 | Alber | B64C 29/02 701/3 |
| 2016/0160989 A1* | 6/2016 | Millard | F16H 55/563 474/14 |
| 2016/0259356 A1 | 9/2016 | Converse | |
| 2017/0012439 A1 | 1/2017 | Yanchai et al. | |
| 2017/0012440 A1 | 1/2017 | Converse | |

FOREIGN PATENT DOCUMENTS

| | | |
|---|---|---|
| CN | 105205552 | 12/2015 |
| WO | 2015148011 | 10/2015 |
| WO | 2015195782 | 12/2015 |
| WO | 2016007665 | 1/2016 |
| WO | 2016019012 | 2/2016 |
| WO | 2017064358 | 4/2017 |

\* cited by examiner

MAINTENANCE OPTIMIZATION CONTROL SYSTEM FOR LOAD SHARING BETWEEN ENGINES

TECHNICAL FIELD

The present disclosure generally relates to adjustment of load sharing between engines. More specifically, the present disclosure relates to a control system to distribute a load having a steady component and a transient component between engines.

BACKGROUND

Power generation systems, may typically include multiple gensets each operated by an engine. Such systems typically include a central control system for controlling operation of engines and electrical machines coupled to the engines. The power output of each engine may be individually controlled and maintained by the central control system. Typically, the central control system may adjust the power output based on fuel efficiency of the engines, total rated power, power availability, or other such functional parameters. Further, the central control system may adjust genset control based on fluctuations in load or load demand.

Typically, a power generation system may include multiple engines with different commissioning dates, with different engine capacities, and with different working fuels etc. Conventionally, the multiple engines may respond to the variability of load of the power generation system uniquely and thereby wear and tear may happen uniquely, making a regular maintenance schedule of the multiple engines difficult. Further, this affects the overall effective operating cost of the power generation system as all the engines wear differently and thus maintenance cost may vary based on different replacement costs of parts of each engine. This may adversely affect operational integrity of the power generation system due to variable rate of wear, economic viability due to cost incurred in costlier engines wearing at the same rate as cheaper engines, and any probability of utilizing the existing or older engines efficiently with newer power generation systems.

U.S. Patent Application No. 2016036450 (hereinafter referred to as '450 reference) describes method of controlling the sharing load between a plurality of electrical generators. The '450 reference includes changing the load distribution between the plurality of electrical generators supplying power to an electrical load, based upon improvements in efficiency of generators. However, the '450 reference does not disclose details about any solution for load sharing between different engines based on wear or maintenance of each engine.

Therefore, an improved control system for load sharing between engines is required.

SUMMARY

In an aspect of the present disclosure, a control system for load sharing between engines is provided. The control system includes a first engine having an associated first criteria, a second engine having an associated second criteria, a load having a steady component and a transient component, and controller communicably coupled to the first engine, the second engine and the load. The controller selects an engine from the first engine and the second engine based at least on the first criteria and the second criteria. The controller then distributes the load between the first engine and the second engine such that only the selected engine is operated under transient component of the load.

In another aspect of the present disclosure, a method for sharing a load having a steady component and a transient component between a first engine and a second engine is disclosed. The method includes selecting by a controller an engine from the first engine and the second engine, based at least on an associated first criteria of the first engine and an associated second criteria of the second engine. The method further includes distributing the load by the controller between the first engine and the second engine such that only the selected engine is operated under the transient component of the load.

In yet another aspect of the present disclosure, a power generation system is disclosed. The power generation system includes a first genset, a first engine coupled to the first genset, wherein the first engine has an associated first criteria. The power generation system includes a second genset, a second engine coupled to the second genset, wherein the second engine has an associated second criteria. The power generation system includes a load having a steady component and a transient component. The power generation system further includes a controller communicably coupled to the first genset and the first engine, the second genset and the second engine, and the load. The controller selects an engine from the first engine and the second engine based at least on the first criteria and the second criteria. The controller then distributes the load between the first engine and the second engine such that only the selected engine is operated under transient component of the load.

DETAILED DESCRIPTION

Figure 1:
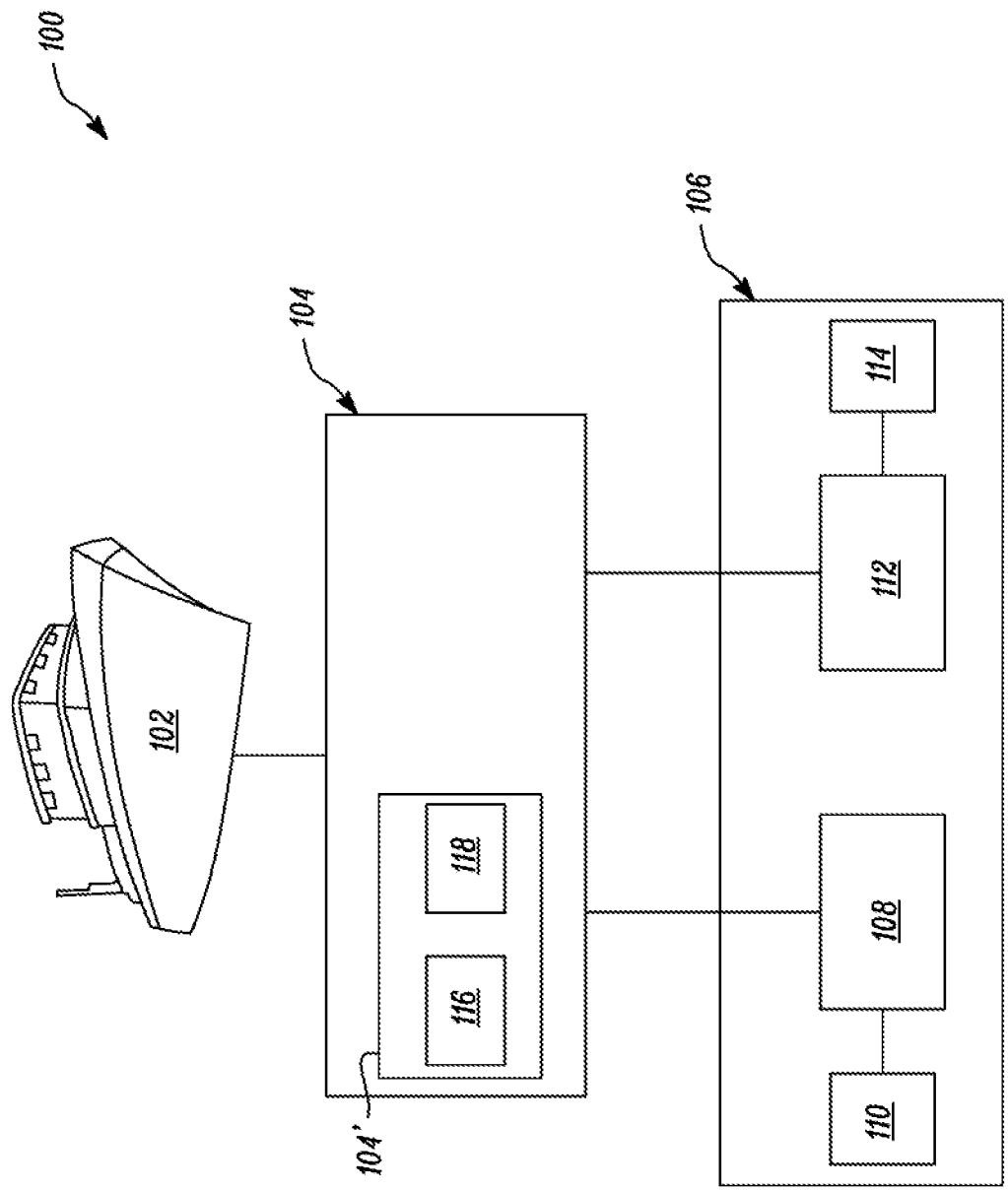
FIG. 1 is a schematic view of a power generation system installed in a vehicle, machine, or vessel, in accordance with an embodiment of the present disclosure.

Wherever possible, the same reference numbers will be used throughout the drawings to refer to same or like parts. FIG. 1 shows an exemplary power generation system 100. The power generation system 100 is illustrated as installed in a ship 102. However, it must be appreciated that the power generation system 100 may be installed in a vehicle, a locomotive, a machine, a vessel, or an industrial setup for generating power. While the following detailed description describes an exemplary aspect in connection with the ship 102, it should be appreciated that the description applies equally to the use of the present disclosure in other setups as well.

As depicted, a control room 104 is communicably coupled to the ship 102, meaning thereby configured to receive and process all data related to parameters of the ship 102. In an embodiment, and as per requirement, the control room 104 may include at least one processor 104' for storing and processing the data exchanged with the ship 102. In an embodiment, the control room 104 may be remotely located or accessible, for example, via internet. The control room 104 is also electronically coupled to an engine room 106. The power generation system 100 includes a first genset 108 coupled to a first engine 110 and a second genset 112 coupled to a second engine 114. The first engine 110 and the second engine 114 are placed inside the engine room 106. It must be contemplated that although the illustrated embodiment shows only two gensets and two associated engines, the number of gensets and engines may vary depending on amount of power required to be generated, and the present disclosure is not limited by the number of gensets and the number of engines being used in any manner. For example, no. of engines or gensets required to generate power for a ship may vary from the number required for a locomotive, or from the number required for any small industrial setup, etc., without affecting the scope of the present disclosure. Further, the term 'genset' may include a diesel generator or a diesel engine and electric generator, or any other such generator or storage of electrical power known in the art and suitable for power generation applications.

The first engine 110 has an associated first criteria 116 and the second engine 114 has an associated second criteria 118. In an exemplary embodiment, the first criteria 116 and/or the second criteria 118 may be stored and processed by the at least one processor 104'. In an embodiment, the first criteria 116 of the first engine 110 may be any one of a first maintenance cost of the first engine 110, a first load factor of the first engine 110, a first engine age of the first engine 110, and a first response time of the first engine 110, among other parameters. In an embodiment, all the above parameters of the first criteria 116 may be applied individually, together, or in combinations of parameters.

Similarly, the second criteria 118 of the second engine 114 may be any one of a second maintenance cost of the second engine 114, a second load factor of the second engine 114, a second engine age of the second engine 114, and a second response time of the second engine 114, among other parameters. In an embodiment, all the above parameters of the second criteria 118 may be applied individually, together, or in combinations of parameters. In an embodiment, the first load factor and the second load factor are both less than one.

In an embodiment, the first maintenance cost and/or the second maintenance cost may include costs for repair and replacements of the first engine 110 and the second engine 114. In some embodiments, the first and second maintenance costs may include costs for replacements of parts for preventive maintenance or maintenance post occurrence of failure, costs for preventive repair or repair post occurrence of the failure of the first engine 110 and the second engine 114, and other such associated replacement and repair costs.

In an embodiment, the first engine age and the second engine age may be ascertained based on a manufacturing date of the engines, a first operational date of the engines, a date of major overhaul of the engines, a last scheduled maintenance date, or any such relevant operational date of the first engine 110 and the second engine 114. In another embodiment, the first response time and the second response time may include minimum time required by the engines for controlling the power generation based on any transient operational condition, parameter, or user command.

Figure 2:
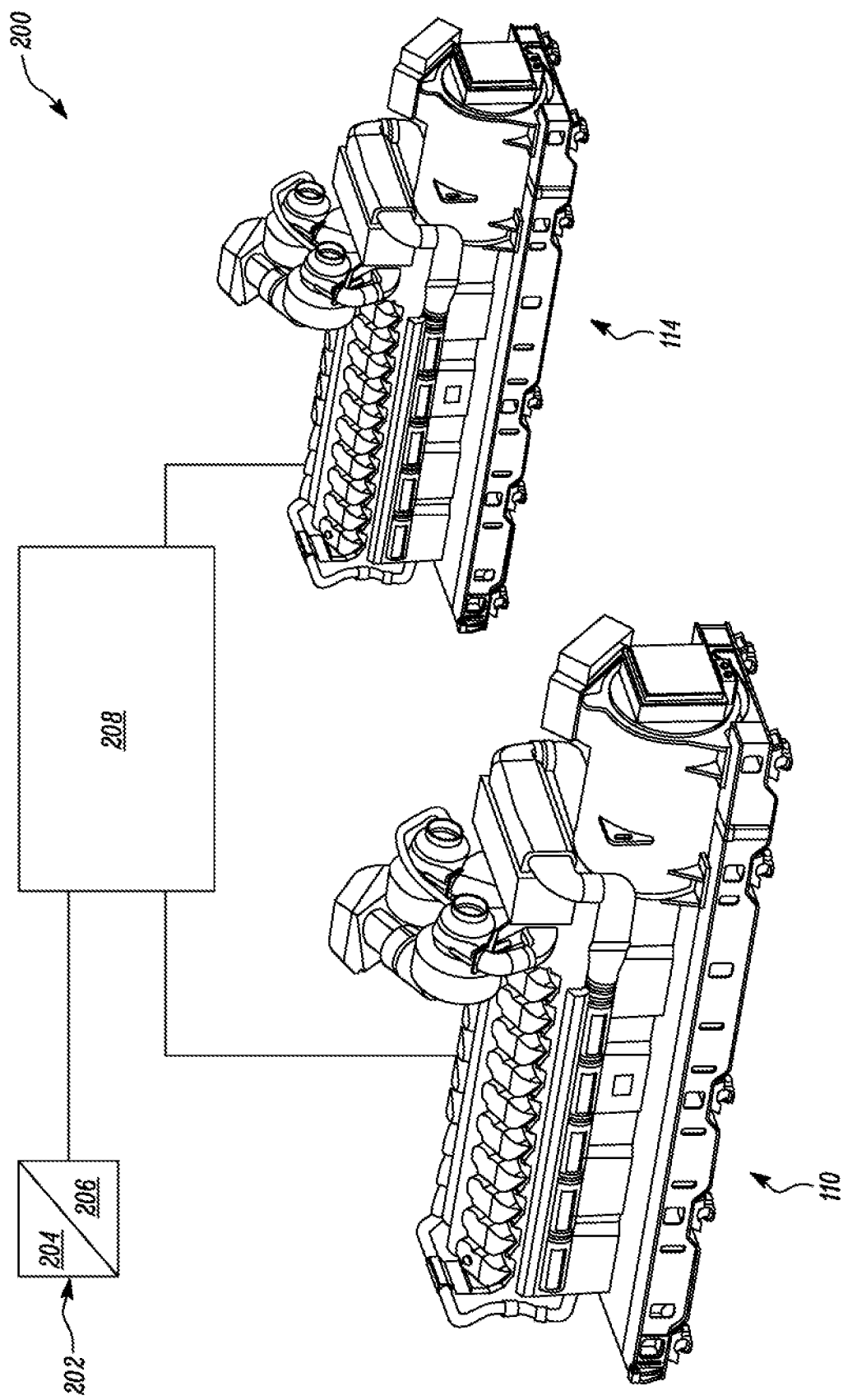
FIG. 2 is a block diagram showing a control system, in accordance with an embodiment of the present disclosure.

Now referring to FIG. 2, the first engine 110 and the second engine 114 are depicted. In an embodiment, the first engine 110 may be different than the second engine 114 in many aspects such as structural features and functional parameters, including in terms of responding to fluctuating power demands etc. In an embodiment, the first engine 110 may be less costly than the second engine 114 in terms of capital and operating costs. In another embodiment, the first engine 110 may have a lower maintenance cost than the second engine 114. In some embodiments, the first load factor of the first engine 110 may be less than the second load factor of the second engine 114. In an embodiment, the first load factor and the second load factor may be both less than one. In an embodiment, the first engine age of the first engine 110 may be more than the second engine age of the second engine 114. In another embodiment, the first response time of the first engine 110 may be less than the second response time of the second engine 114. In some embodiments, the replacement parts of the first engine 110 are cheaper than that of the second engine 114.

FIG. 2 illustrates a control system 200 for the power generation system 100. The control system 200 includes a load 202 having a steady component 204 and a transient component 206. In an embodiment, the steady component 204 of the load 202 may include loads related to routine components and processes of the concerned installation environment of the power generation system 100. For example, for the illustrated embodiment, loads related to propulsion (for example, propellers), lighting, cargo handling equipment, thrusters, heating ventilation and air-conditioning (HVAC) systems, navigational systems, communications systems, water pumps, and other such loads normally found in a marine vessel, may be included in the steady component 204.

However, the transient component 206 of the load 202 may include loads related to variable processes or enhanced loads due to increased demand from any tool. The transient component 206 of the load 202 may also include spikes in the load 202 due to any unforeseen circumstances or any unplanned load. For example, the transient component 206 may include a sudden change due to change in speed or a sudden maneuver demand. Similarly, spikes may be generated during handling of various cargoes, constituting the transient component 206 of the load 202. Other loads constituting the transient component 206 of the load 202 may include spikes due to poor handling, adverse terrain, severe seas, and other such occasional events.

The control system 200 further includes a controller 208 communicably coupled to the first engine 110, the second engine 114, and the load 202. The controller 208 may be a single controller or multiple controllers working together to perform a variety of tasks. The controller 208 may embody a single or multiple microprocessors, field programmable gate arrays (FPGAs), digital signal processors (DSPs), etc., that include a means for load sharing between the first engine 110 and the second engine 114. Numerous commercially available microprocessors can be configured to perform the functions of the controller 208. Various known circuits may be associated with the controller 208, including power supply circuitry, signal-conditioning circuitry, actuator driver circuitry (i.e., circuitry powering solenoids, motors, or piezo actuators), and communication circuitry. Various functions of the controller 208 and respective applications are described later in the disclosure.

The first engine 110 and the second engine 114 of the power generation system 100 may include a plurality of sensors (not shown) for measuring parameters like, age, real-time response time, load demands and fluctuations, etc. In another embodiment, data related to the above parameters may be pre-determined in standard test conditions and stored in a memory (not shown) accessible to the controller 208. It must be contemplated that the various sensors described in this disclosure may include any suitable sensor known in the art for the described applications. In some embodiments, the various sensors may include analog sensors, digital sensors, or a combination of analog and digital sensors. In other embodiments, the sensors may include mechanical, optical, laser, or any other such suitable sensors known in the art. It should be contemplated that the control system 200 may include various other sensors as well to measure various other parameters related to the power generation system 100.

In some embodiments, the control system 200 may be positioned onboard the power generation system 100. In other embodiments, the control system 200 may be partially positioned at an off-board location relative to the power generation system 100. The present disclosure, in any manner, is not restricted to the type of controller 208 as well as the type of sensors coupled to the power generation system 100.

With combined reference to FIGS. 1-2, the power generation system 100 is operating and the first engine 110 and the second engine 114 are generating power. The controller 208 of the control system 200 controls the load 202 shared between the first engine 110 and the second engine 114. The controller 208 selects an engine from the first engine 110 and the second engine 114 based at least on the first criteria 116 and the second criteria 118. In an embodiment, the first criteria 116 and the second criteria 118 may be exchanged and processed by the controller 208. The controller 208 then distributes the load 202 between the first engine 110 and the second engine 114 such that only the selected engine is operated under transient component of the load 202.

In an embodiment, the first criteria 116 includes a first maintenance cost of the first engine 110 and the second criteria 118 includes a second maintenance cost of the second engine 114. The controller 208 then distributes the load 202 between the first engine 110 and the second engine 114 by selecting the engine having the lesser maintenance cost. In an embodiment, the controller 208 may determine the first and the second maintenance costs by accessing previous maintenance costs of the first engine 110 and the second engine 114 from the memory. In another embodiment, the controller 208 may determine the first and the second maintenance costs by accessing maintenance archives over the internet. In an embodiment, the controller 208 selects the first engine 110 if the first maintenance cost is less than the second maintenance cost.

In some embodiments, the first criteria 116 includes a first load factor of the first engine 110 and the second criteria 118 includes a second load factor of the second engine 114. In an embodiment, the first load factor and the second load factor may be both less than one. In an embodiment, the first load factor and the second load factor may include the ratio of a measured load against power ratings of the first engine 110 and the second engine 114, respectively. In other embodiments, the load factors may relate to overall efficiency of the first engine 110 and the second engine 110. The controller 208 then distributes the load 202 between the first engine 110 and the second engine 114 by selecting the engine having the lesser load factor. In an embodiment, the controller 208 may determine the first and the second load factors from a real-time detected load 202 via sensors, and stored in the memory. In an embodiment, the controller 208 selects the first engine 110 if the first load factor is less than the second load factor.

In another embodiment, the first criteria 116 includes the first engine age of the first engine 110 and the second criteria 118 includes the second engine age of the second engine 114. The controller 208 then distributes the load 202 between the first engine 110 and the second engine 114 by selecting the engine having the higher engine age. In an embodiment, the engine age may be determined by the controller 208 based on any of the first operational date, the date of major overhaul of the engines, or the last scheduled maintenance date recorded in the memory. In an embodiment, the controller 208 selects the first engine 110 if the first engine age is more than the second engine age.

In an embodiment, the first criteria 116 includes the first response time of the first engine 110 and the second criteria 118 includes the second response time of the second engine 114. The controller 208 then distributes the load 202 between the first engine 110 and the second engine 114 by selecting the engine having the faster response time. In an embodiment, the controller 208 may determine the response time of various engines based on previously recorded response times of the first engine 110 and the second engine 114. In an embodiment, the controller 208 may determine the response time in real-time based on a test load (not shown) put on the first engine 110 and the second engine 114, and the minimum time recorded for the two engines. In some embodiments, the controller 208 may determine the response time based on a table (not shown) having values for a particular type of the load 202 and the standard response time for such types of the load 202. In an embodiment, the controller 208 selects the first engine 110 if the first response time is less than the second response time. In another embodiment, the controller 208 selects the engine based on individual response time of the first engine 110 and the second engine 114 if the first engine 110 and the second engine 114 are of same age.

INDUSTRIAL APPLICABILITY

Figure 3:
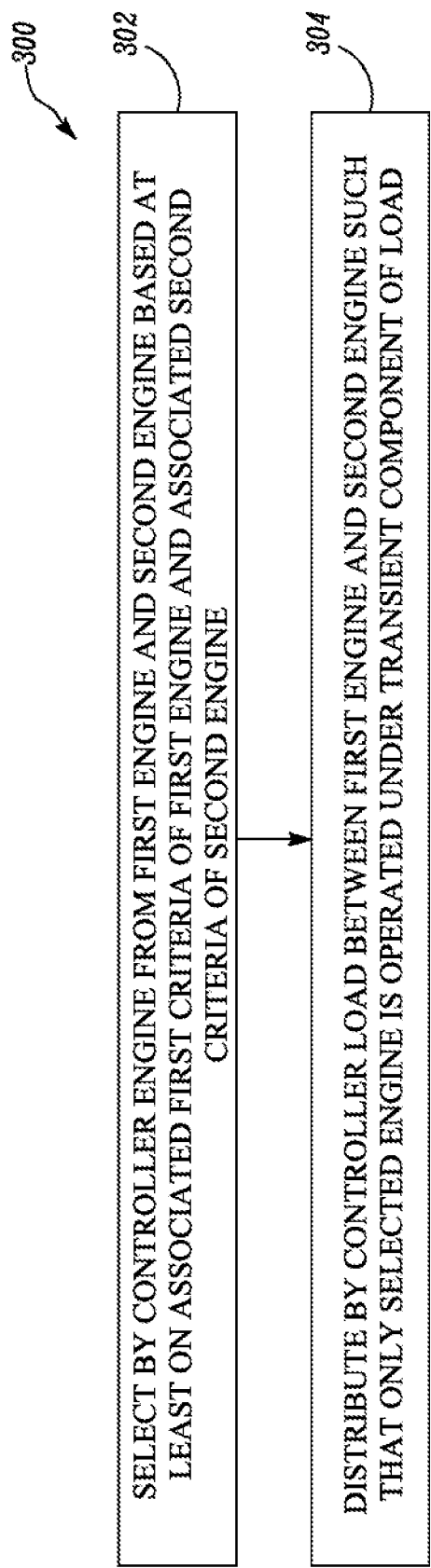
FIG. 3 is a schematic flow chart depicting a method of sharing a load between a first engine and a second engine, in accordance with an embodiment of the present disclosure.

The present disclosure provides an improved method 300 for sharing the load 202 having the steady component 204 and the transient component 206, between the first engine 110 and the second engine 114 of the power generation system 100. The method 300 for sharing the load 202 between engines is illustrated with the help of FIG. 3. In an embodiment, the ship 102 is switched on and is operating to sail or perform an operation.

The method 300 at step 302 includes selecting by the controller 208 an engine from the first engine 110 and the second engine 114 based at least on the first criteria 116 of the first engine 110 and the second criteria 118 of the second engine 114. The first criteria 116 and the second criteria 118 may be received from the memory accessible to the controller 208. The method 300 at step 304 includes distributing the load 202 between the first engine 110 and the second engine 114 by the controller 208 such that only the selected engine is operated under the transient component 206 of the load 202. Operating any engine heavily on transient loads adversely affects total expected working life. Thus, one of the first engine 110 and the second engine 114 may have lower working life than the other. In other words, life of one of the first engine 110 and the second engine 114 may be enhanced by always operating the other with the transient component 206.

In some embodiments, the method 300 may further include selecting by the controller 208 an engine from the first engine 110 and the second engine 114 based at least on the first criteria 116 being a first maintenance cost of the first engine 110, and the second criteria 118 being a second maintenance cost of the second engine 114. The controller 208 selects the first engine 110 if the first maintenance cost is less than the second maintenance cost. Operating the first engine 110, that is the engine with cheaper maintenance cost, under the transient component 206 lowers the operating life and maintenance intervals of the first engine 110, while increases the life and maintenance intervals of the second engine 114.

In an embodiment, the method 300 may further include selecting by the controller 208 an engine from the first engine 110 and the second engine 114 based at least on the first criteria 116 being a first load factor and the second criteria 118 being a second load factor. In an embodiment, the first load factor and the second load factor are both less than one. The controller 208 selects the first engine 110 if the first load factor is less than the second load factor. This enables better load sharing management as the transient component 206 is always shared by the engine on lower load demand, thus having more available power to handle the transient component 206. In other words, the controller 208 shares the transient component 206 always with an efficiently running engine.

Additionally, the method 300 may include selecting by the controller 208 an engine from the first engine 110 and the second engine 114 based at least on the first criteria 116 being the first engine age and the second criteria 118 being the second engine age. The controller 208 selects the first engine 110 if the first engine age is more than the second engine age. This enhances the life of the second engine 114 being always run on the steady component 204 while decreases the life of the first engine 110 due to regular handling of the transient component 206. Further, this reduces the total operating cost as the older and cheaper engine is being sacrificed for handling all the transient component 206. The method 300 may include selecting by the controller 208 an engine from the first engine 110 and the second engine 114 based at least on the first criteria 116 being the first response time and the second criteria 118 being the second response time. The controller 208 selects the first engine 110 if the first response time is less than the second response time. The controller 208 also selects the first engine 110 if the first response time is less than the second response time, and the first engine 110 and the second engine 114 are of the same age. This provides better and faster load handling by the power generation system 100 for any instantaneous loads.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for load sharing between engines, the control system comprising:
    a first engine having an associated first criteria, wherein the first criteria includes at least a first load factor indicating a first ratio of a first load on the first engine to the power rating of the first engine;
    a second engine having an associated second criteria, wherein the second criteria includes at least a second load factor indicating a second ratio of a second load on the second engine to the power rating of the second engine;
    at least one sensor for measuring the first and second criteria, wherein the at least one sensor includes a load sensor for measuring a load demand of the first and second engines;
    a load having a steady component and a transient component; and
    a controller communicably coupled to the first engine, the second engine, the load sensor, and the load, wherein the controller is configured to:
        determine the first and second load factors based on the corresponding measured load demand;
        select an engine from the first engine and the second engine based at least on the first criteria and the second criteria, wherein at least the engine having a lesser load factor is selected;
        distribute the transient component of the load only to the selected engine and distribute the steady component of the load only to the nonselected engine.

2. The control system of claim 1, wherein the first criteria includes a first maintenance cost of the first engine and the second criteria includes a second maintenance cost of the second engine, and the controller is configured to select the engine having the lower maintenance cost.

3. The control system of claim 1, wherein the first load factor of the first engine and the second load factor of the second engine are both less than 1.

4. The control system of claim 3, wherein the steady component includes loads related to non-variable processes and the transient component includes loads related to variable processes.

5. The control system of claim 1, wherein the first criteria includes a first engine age of the first engine and the second criteria includes a second engine age of the second engine, and the controller is configured to select the engine having the greater engine age.

6. The control system of claim 1, wherein the first criteria includes a first response time of the first engine and the second criteria includes a second response time of the second engine, the least one sensor includes a response time sensor for measuring the response time of the first and second engines, and the controller is configured to select the engine having the faster response time.

7. The control system of claim 1, wherein if the first engine and the second engine are of same age, the controller selects the engine based on individual response time of the first engine and the second engine.

8. A method for sharing a load having a steady component and a transient component between a first engine and a second engine, the method comprising:
    measuring, by at least one sensor, a first criteria associated with the first engine and a second criteria associated with the second engine, wherein the at least one sensor includes a load sensor for measuring a load demand of the first and second engines;
    determining, by a controller, a first load factor based on the measured first criteria and a second load factor based on the measured second criteria, wherein the first load factor indicates a first ratio of a first load on the first engine to the power rating of the first engine and the second load factor indicates a second ratio of a second load on the first engine to the power rating of the first engine;
    selecting, by the controller, an engine from the first engine and the second engine based at least on an associated first criteria of the first engine and an associated second criteria of the second engine, wherein the engine having a lesser load factor is selected;
    distributing, by the controller, the transient component of the load only to the selected engine and distribute the steady component of the load only to the nonselected engine.

9. The method of claim 8, wherein the first criteria includes a first maintenance cost of the first engine and the second criteria includes a second maintenance cost of the second engine, and the controller selects the engine having the lower maintenance cost.

10. The method of claim 8, wherein the first load factor of the first engine and the second load factor of the second engine are both less than 1.

11. The method of claim 10, wherein the steady component includes loads related to non-variable processes and the transient component includes loads related to variable processes.

12. The method of claim 8, wherein the first criteria includes a first engine age of the first engine and the second criteria includes a second engine age of the second engine, the method further comprising:
   selecting, by the controller, the engine having the greater engine age.

13. The method of claim 8, wherein the first criteria includes a first response time of the first engine, and the second criteria includes a second response time of the second engine, the method further comprising:
   measuring, by the at least one sensor, the response time of the first and second engines; and
   selecting, by the controller, the engine having the faster response time.

14. The method of claim 8, wherein the first engine and the second engine are of same age, the method further comprising:
   selecting, by the controller, the first engine if the first response time is less than the second response time.

15. A power generation system comprising:
   a first engine coupled to a first genset, wherein the first engine has an associated first criteria which includes at least a first load factor indicating a first ratio of a first load on the first engine to the power rating of the first engine;
   a second engine coupled to a second genset, wherein the second engine has an associated second criteria which includes at least a second load factor indicating a second ratio of a second load on the second engine to the power rating of the second engine;
   at least one sensor for measuring the first and second criteria, wherein the at least one sensor includes a load sensor for measuring a load demand and a response time sensor for measuring the response time of the first and second engines;
   a load having a steady component and a transient component, the steady component including loads related to non-variable processes and the transient component including loads related to variable processes; and
   a controller communicably coupled to the first genset, the first engine, the second genset, the second engine, the at least one sensor, and the load, wherein the controller is configured to:
      determine the first and second load factors based on the corresponding measured load demand;
      select an engine from the first engine and the second engine based at least on the first criteria and the second criteria, wherein at least the engine having a lesser load factor is selected;
      distribute the transient component of the load only to the selected engine and distribute the steady component of the load only to the nonselected engine.

16. The power generation system of claim 15, wherein the first criteria includes a first maintenance cost of the first engine and the second criteria includes a second maintenance cost of the second engine, and the controller is configured to select the engine having the lower maintenance cost.

17. The power generation system of claim 15, wherein the first load factor of the first engine and the second load factor of the second engine are both less than 1.

18. The power generation system of claim 17, wherein the controller selects the first engine if the first load factor is less than the second load factor.

19. The power generation system of claim 15, wherein the first criteria includes a first engine age of the first engine and the second criteria includes a second engine age of the second engine, and the controller is configured to select the engine having the greater engine age.

20. The power generation system of claim 15, wherein the first criteria includes a first response time of the first engine and the second criteria includes a second response time of the second engine, and the controller selects the first engine if the first response time is less than the second response time.

* * * * *